United States Patent Office 2,937,151
Patented May 17, 1960

---

2,937,151

METHOD FOR RECLAIMING CURED CELLULAR POLYURETHANES

Theodore R. Ten Broeck, Hudson, and Donald W. Peabody, Akron, Ohio, assignors to The Goodyear Tire & Rubber Company, Akron, Ohio, a corporation of Ohio No Drawing. Application June 27, 1955
Serial No. 518,394

4 Claims. (Cl. 260—2.3)

This invention relates to the reprocessing of cured flexible elastomeric cellular materials produced from liquid reaction mixtures containing active-hydrogen-containing polymeric materials, polyisocyanate and water. More particularly, it relates to methods for converting waste materials of little utility into a liquid state so that they can be reprocessed with fresh liquid reaction mixtures into useful articles of commerce.

The production of flexible elastomeric cellulor structures from liquid polymeric reaction mixtures containing polyisocyanates is a comparatively recent development. The reaction mixtures from which the cellular structures are made contain polymeric materials which are either liquid at room temperature or capable of being melted at relatively low temperatures. The polymeric materials contain active-hydrogen atoms which react with the isocyanate groups to form a network of crosslinked molecular chains. The polyisocyanate functions not only to chain-extend and to cross-link or cure the polymeric material, but also to react with water and carboxyl groups present in the liquid reaction mixture to form carbon dioxide which causes the liquid reaction mixture to expand and foam. An expanded reaction mixture is produced which develops a flexible, elastomeric, cellular character as the polymer is crosslinked or cured.

Examples of the active-hydrogen-containing polymeric materials useful in producing the cellular products are polyesters, polyesteramides, polyalkylene ether glycols, and mixtures of two or more of these. By the term "active-hydrogen" used to describe these polymeric materials is meant those hydrogen atoms which are reactive as measured and determined by the Zerewitinoff method. The polyesters are prepared by the condensation reaction between one or more glycols and one or more dibasic carboxylic acids. The polyesteramides are prepared from one or more glycols, one or more dibasic carboxylic acids and relatively small amounts of one or more bifunctional amino-bearing compounds such as amino carboxylic acids, amino alcohols, or diamines. Small amounts of trifunctional materials may optionally be employed in preparing the active-hydrogen-containing polyesters and polyesteramides. Any dibasic carboxylic acid, preferably those whose carboxyl groups are attached to terminal carbons, may be used to form the polyester or polyesteramide, including succinic, glutaric, adipic, pimelic, suberic, azelaic, sebacic, malonic, brassylic, tartaric, maleic, malic, fumaric, dilinoleic, thiodibutyric, diphenic, isophthalic, terephthalic, hexahydroterephthalic, p-phenylene diacetic, dihydromuconic, and betamethyladipic acids.

Any glycol may be used in the formation of the polyester including ethylene, propylene 1,2, propylene 1,3, diethylene, triethylene, butylene, pentamethylene, hexamethylene, decamethylene, dodecamethylene, and N,N-diethanolaniline, glycerine mono ethers, and thiodiglycol.

Any amino alcohol having at least one hydrogen atom attached to the amino nitrogen atom may be employed including ethanolamine, 3 aminopropanol, 4-amino-butanol, 6-amino-hexanol, and 10 amino-decanol.

Examples of the diamines which may be used are ethylene, propylene 1,2, tetramethylene 1,4, hexamethylene 1,6 decamethylene 1,10, piperazine, isopropyl amino propyl amine, and 3,3' diamino dipropyl ether. Listed below are the reactants which are used to form particular polyesters and polyesteramides.

(1) Ethylene glycol plus adipic acid.
(2) Propylene glycol 1,2 plus adipic acid.
(3) Ethylene glycol (80 mol percent) propylene glycol 1,2 (20 mol percent) plus adipic acid.
(4) Ethylene glycol (80 mol percent) propylene glycol 1,2 (20 mol percent) plus azelaic acid.
(5) Ethylene glycol (80 mol percent), propylene glycol 1,2 (20 mol percent) plus sebacic acid.
(6) Ethylene glycol (80 mol percent) propylene glycol 1,2 (20 mol percent) plus dilinoleic acid (20 mol percent), adipic acid (80 mol percent).
(7) Ethylene glycol (80 mol percent), glycerine monoethyl ether (20 mol percent) plus adipic acid.
(8) Ethylene glycol (80 mol percent), butylene glycol 1,4 (20 mol percent) plus adipic acid.
(9) Ethylene glycol (80 mol percent), propylene glycol 1,3 (20 mol percent) plus adipic acid.
(10) Ethylene glycol (80 mol percent), pentane diol 1,5 (20 mol percent) plus adipic acid.
(11) Ethylene glycol (80 mol percent) glycerine monoisopropyl ether (20 mol percent) plus adipic acid.
(12) Ethylene glycol (80 mol percent), propylene glycol 1,2 (from 18 to 5 mol percent), ethanol amine (from 2 to 15 mol percent) plus adipic acid.
(13) Ethylene glycol (80 mol percent), propylene glycol 1,2 (20 mol percent) plus maleic acid (from 3 to 6 mol percent), adipic acid (from 97 to 94 mol percent).
(14) Ethylene glycol (80 mol percent) propylene glycol 1,2 (from 19 to 17 mol percent), piperazine (from 1 to 3 mol percent) plus adipic acid.
(15) Ethylene glycol (80 mol percent), propylene glycol 1,2 (from 18 to 5 mol percent), dihydroxyethyl aniline (from 2 to 15 mol percent) plus adipic acid.
(16) Ethylene glycol (80 mol percent), butylene glycol 1,4 (20 mol percent) plus adipic acid.
(17) Ethylene glycol (80 mol percent), diethylene glycol (20 mol percent) plus adipic acid.
(18) Ethylene glycol (from 90 to 10 mol percent) propylene glycol 1,2 (from 10 to 90 mol percent) plus adipic acid.
(19) Ethylene glycol (from 90 to 10 mol percent), propylene glycol 1,2 (from 10 to 90 mol percent) plus azelaic acid.

The polyalkylene ether glycols are hydroxy-terminated polyethers derived from alkylene oxides or glycols or from heterocyclic ethers such as dioxolane. Further examples of these active-hydrogen-containing polymeric materials and methods for their preparation are described in United States Patents 2,625,531; 2,625,532; and 2,625,535 which show polyesters and polyesteramides and United States Patents 2,692,873 and 2,702,797 which show the polyalkylene ether glycols such as the polyethylene ether glycols, the polypropylene ether glycols and the polybutylene ether glycols. Preferred active-hydrogen-containing polymeric materials are the polyesters and polyesteramides having an average molecular weight of from approximately 1,000 to 5,000, an acid number not greater than 5, and a hydroxyl number from 20 to 110. Best results are obtained with polyesters having an acid number not greater than 2, a hydroxyl number of approximately 60, and an average molecular weight of approximately 2,000.

In the production of the elastomeric, flexible, cellular products any organic polyisocyanate or mixtures of polyisocyanates may be employed. The amount of polyisocyanate should be at least sufficient to crosslink the active-hydrogen-containing polymeric material and to react with the water present to form carbon dioxide gas. In general, from 2 to 8 equivalents of isocyanate per mol of polymeric material may be used, with best results being obtained when approximately 3 mols of a liquid diisocyanate per mol of polymeric material are employed. Representative examples of polyisocyanates which may be employed are the diisocyanates, such as hexamethylene diisocyanate; para-phenylene diisocyanate; meta-phenylene diisocyanate; 4,4'-diphenylene diisocyante; 1,5-naphthalene diisocyanate; 4,4'-diphenylene methane diisocyanate; the tolylene diisocyanates; 4,4'-diphenyl ether diisocyanate; 3,3'-dimethyl 4,4'-diphenyl diisocyanate; and 3,3'-dimethoxy 4,4'-diphenyl diisocyanate; the triisocyanates, such as 4,4',4''-triphenylmethane diisocyanate; and toluene 2,4,6 triisocyanate; the tetraisocyanates, such as 4,4'-dimethyl-diphenyl methane 2,2',5,5'-tetraisocyanate and mixtures of polyisocyanates, such as those described in U.S. Patent 2,683,730. Of these the liquid tolylene diisocyanates, such as 2,4-tolylene diisocyanate and 2,6-tolylene diisocyanate or mixtures of these are particularly preferred.

The water in the reaction mixture is provided to generate the carbon dioxide gas for foaming as well as to furnish points of reaction for crosslinking the polymeric material. In addition to the three essential ingredients (polymer, polyisocyanate, and water) the reaction mixture may optionally contain pigment fillers, reinforcing agents, coloring agents, antioxidants, and catalysts.

In the production of flexible elastomeric cellular products from reaction mixtures such as those described above, the molded articles formed usually require trimming to conform to the exact shape or size desired. Also, there is a certain amount of cured material which has been torn or otherwise damaged during the production operations. In addition there may be cellular material which does not meet the physical standards set up to insure that the product gives satisfactory service. The trimmings and damaged or off-test material cannot be sold as first class merchandise and must usually be sold as scrap or waste at a relatively low price. This, of course, adds to the production cost of the first class material. No satisfactory method for utilizing this material, other than for scrap, has been developed.

It is, therefore, the broad object of this invention to provide a method for utilizing this waste material in a manner to permit the manufacturer to recover a more substantial proportion of his costs. Another object is to provide a method for reprocessing or re-working this material into articles of first class quality. Still another object is to provide for the reprocessing of this cured material without adversely affecting the physical properties of the cured cellular products containing the reprocessed waste material. Other objects will appear as the description proceeds.

It has been discovered that the scrap material can be utilized by dissolving it in a liquid active-hydrogen-containing polymeric material which can then be processed into the desired cellular products in the same manner as the liquid material containing none of the dissolved scrap. The dissolving of the cured scrap in the "fresh" liquid material is accomplished by heating the mixture at elevated temperatures. The rate of dissolving the cured scrap is increased if the scrap is first comminuted, as by cutting or grinding, for instance, into relatively small volume size such as approximately ½ inch cubes. The temperature at which the mixture is heated is not critical, but it has been found that excessively high temperatures result in the production of cellular products which are discolored. Temperatures up to 250° C. minimize this tendency to discolor. Another method for minimizing discoloration is to heat the scrap-containing solution under a vacuum of approximately 20 millimeters of mercury, although this is not essential for the production of otherwise satisfactory scrap-containing liquid mixtures. It is possible to produce scrap-containing liquid mixtures which contain as much as 50% by weight of dissolved scrap. Mixtures which do not contain more than 25%, and more specifically approximately 10% by weight, of dissolved scrap are preferred. The time required to dissolve the cured scrap in the fresh liquid polymeric material will depend upon the amount of scrap being dissolved and the temperature at which the mixture is heated, with smaller amounts of scrap and higher temperatures resulting in the minimum solution time.

The practice of this invention is illustrated with reference to the following examples which are representative rather than restrictive of the scope of this invention and in which, unless otherwise specified, parts shown are by weight.

EXAMPLE 1

A polyester (100 parts) prepared from diethylene glycol and adipic acid and having an hydroxyl number of 71 and an acid number of 1.0 was mixed with 1.0 part of polyethylene glycol, 1.0 part of a surface-active agent which is a polyoxyethylated vegetable oil, 1.0 part of N-methyl morpholine, 2.7 parts of water and 30.0 parts of a mixture of tolylene diisocyanates containing approximately 80% by weight of 2,4-tolylene diisocyanate and approximately 20% by weight of 2,6-tolylene diisocyanate. This solution was thoroughly blended and when the foaming reaction began, the mixture was poured into a mold where it was permitted to expand. The foamed material was allowed to remain at room temperature for five days before physical tests were run.

EXAMPLE 2

A polyester (100 parts) prepared from diethylene glycol and adipic acid and having an hydroxyl number of 71 and an acid number of 1.0 was mixed with 1.0 part of polyethylene glycol and 1.0 part of a surface-active agent which is a polyoxyethylated vegetable oil and 1.0 part of N-methyl morpholine and 2.7 parts of water and 36.0 parts of a mixture of tolylene diisocyanates containing approximately 80% by weight of 2,4-tolylene diisocyanate and approximately 20% by weight of 2,6-tolylene diisocyanate. This solution was thoroughly blended and when the foaming reaction began, the mixture was poured into a mold where it was permitted to expand. The foamed material was allowed to remain at room temperature for five days before physical tests were run.

EXAMPLE 3

Scrap foam material (20 parts) cut into approximately one-half inch cubes was added to a mixture of polyesters containing 70 parts of a polyester prepared from diethylene glycol and adipic acid and having an hydroxyl number of 71 and an acid number of 1.0 and 10 parts of a polyester prepared from 80 mol percent of ethylene glycol and 20 mol percent of propylene glycol and adipic acid and having an hydroxyl number of 60 and an acid number of 1.0. The cured scrap employed was originally prepared from the reaction of a polyester, a polyisocyanate and water. This polyester/scrap mixture was heated for 2 hours at a temperature of 250° C., under a vacuum of 20 millimeters at the end of which time the scrap had completely dissolved in the polyester. This solution containing the dissolved scrap was employed to make up a reaction mixture containing 10 parts scrap material, 80 parts of a polyester made from diethylene glycol and adipic acid and 10 parts of a polyester made from approximately 80 mol percent of ethylene glycol and approximately 20 mol percent of propylene glycol and adipic acid. The polyester/scrap mixture (100 parts total containing 10 parts dissolved scrap) was blended with the same amounts of diisocyanate, water and other ingredients called for in Example 1. When the foaming reaction began, the mixture was poured into a mold where it was permitted to expand. The foamed material was allowed to remain at room temperature for five days before physical tests were run.

EXAMPLE 4

Scrap foam material (20 parts) cut into approximately one-half inch cubes was added to a mixture of polyesters containing 70 parts of a polyester prepared from diethylene glycol and adipic acid and having an hydroxyl number of 71 and an acid number of 1.0 and 10 parts of a polyester prepared from 80 mol percent of ethylene glycol and 20 mol percent of propylene glycol and adipic acid and having an hydroxyl number of 60 and an acid number of 1.0. The cured scrap employed was originally prepared from the reaction of a polyester, a polyisocyanate and water. This polyester/scrap mixture was heated for 2 hours at a temperature of 250° C., under a vacuum of 20 millimeters, at the end of which time the scrap had been completely dissolved in the polyester. This solution containing the dissolved scrap was then employed to make up a reaction mixture containing 10 parts scrap material, 80 parts of a polyester made from diethylene glycol and adipic acid and 10 parts of a polyester made from 80 mol percent of ethylene glycol and 20 mol percent of propylene glycol and adipic acid. The polyester/scrap mixture (100 parts total containing 10 parts dissolved scrap) was blended with the same amounts of diisocyanate, water and other ingredients called for in Example 2. When the foaming reaction began, the mixture was poured into a mold where it was permitted to expand. The foamed material was allowed to remain at room temperature for five days before physical tests were run.

EXAMPLE 5

Scrap foam material (25 parts) cut into approximately one-half inch cubes was added to 75 parts of a polyester prepared from diethylene glycol and adipic acid and having an hydroxyl number of 71 and an acid number of 1.0. This polyester/scrap mixture was heated for 2 hours at a temperature of 212° F. under a vacuum of 20 millimeters, at the end of which time the scrap had been completely dissolved. The polyester/scrap mixture (100 parts) was blended with the same amount of the same ingredients as employed in Example 1. When the foaming reaction began, the mixture was poured into a mold where it was permitted to expand. The foamed material was allowed to remain at room temperature for five days before physical tests were run.

The physical properties of the cellular materials produced according to Examples 1 through 5 are tabulated in Table I below, in which density is reported in pounds per cubic foot; tensile strength in pounds per square inch; elongation in percent of original length at break; compression set in percent recovery after being compressed 50 percent of original thickness for 22 hours at 158° F. and RMA Compression in pounds required to compress a one square foot sample 25% of its thickness using a compression disc 8 inches in diameter.

Table I

| Example | Density | Tensile | Elongation | Compression Set | RMA Compression |
|---|---|---|---|---|---|
| 1 | 2.98 | 21.1 | 295 | 97.5 | 37.1 |
| 2 | 2.67 | 23.1 | 250 | 96.3 | 34.2 |
| 3 | 2.86 | 37.0 | 450 | 95.9 | 37.5 |
| 4 | 2.71 | 28.5 | 360 | 96.1 | 37.5 |
| 5 |  | 28.7 | 300 |  |  |

It will be seen from the results reported in Table I that the use of 10% scrap (Examples 3 and 4) and the use of 25% scrap (Example 5) produced cellular materials which had substantially the same physical properties and in some instances improved physical properties over the cellular materials produced from reaction mixtures which contain no scrap (Examples 1 and 2).

In addition to the specific polyesters, diisocyanates and amounts thereof employed in Examples 1 through 5, other materials and amounts which fall within the definitions and limitations disclosed may be employed in the practice of this invention.

While certain representative embodiments and details have been shown for the purpose of illustrating the invention, it will be apparent to those skilled in this art that various changes and modifications may be made therein without departing from the spirit or scope of the invention.

We claim:

1. A method for utilizing cured scrap cellular material produced from the reaction of water, an organic polyisocyanate and a liquid active-hydrogen-containing polymeric material which comprises dissolving up to 50% by weight of said cured scrap cellular material in a liquid active-hydrogen-containing polymeric material by heating the mixture of said scrap material and said liquid material until the scrap material dissolves in the liquid material, the liquid active-hydrogen-containing polymeric material used in making the scrap material and in dissolving the scrap material being selected from the group consisting of polyalkylene ether glycols, polyesters prepared from the condensation reaction between at least one glycol and at least one dicarboxylic acid, polyesteramides prepared from the condensation reaction between at least one glycol, at least one dicarboxylic acid, and at least one bifunctional amino compound selected from the group consisting of diamines, amino alcohols, and amino carboxylic acids, said polyesters and polyesteramides having an acid number not greater than 5 and said polyesters, polyesteramides and polyalkylene ether glycols having an hydroxyl number from 20 to 110 and an average molecular weight of from approximately 1000 to 5000.

2. The method defined by claim 1 in which the amount of cured flexible cellular material dissolved in the liquid polymeric material is approximately 10% by weight.

3. The method defined by claim 1 in which the scrap containing liquid material is heated at a temperature not in excess of 250° C.

4. The method defined by claim 1 in which the scrap-containing liquid material is heated under a vacuum.

References Cited in the file of this patent

UNITED STATES PATENTS 2,729,618    Müller et al.    Jan. 3, 1956
2,741,800    Brockway    Apr. 17, 1956

FOREIGN PATENTS 861,926    Germany    Jan. 8, 1953

OTHER REFERENCES

White: Journal Soc. of Dyers and Colourists, volume 70, No. 11, November 1954, pages 481–6.